United States Patent
Jiang et al.

(10) Patent No.: US 10,570,272 B2
(45) Date of Patent: Feb. 25, 2020

(54) EPOXY RESIN IMBIBED POLYMER PARTICLES

(71) Applicant: Dow Global Technologies LLC, Midland, MI (US)

(72) Inventors: Jingui Jiang, Shanghai (CN); Haipeng Xu, Shanghai (CN); Wanxia Zhu, Shanghai (CN); Youjun Wu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 56 days.

(21) Appl. No.: 15/320,849

(22) PCT Filed: Jul. 4, 2014

(86) PCT No.: PCT/CN2014/081677
§ 371 (c)(1),
(2) Date: Dec. 21, 2016

(87) PCT Pub. No.: WO2016/000264
PCT Pub. Date: Jan. 7, 2016

(65) Prior Publication Data
US 2017/0158843 A1 Jun. 8, 2017

(51) Int. Cl.
*C08L 3/02* (2006.01)
*D06N 3/00* (2006.01)
(Continued)

(52) U.S. Cl.
CPC ............. *C08L 3/02* (2013.01); *C08L 33/26* (2013.01); *C08L 63/00* (2013.01); *D04H 1/587* (2013.01);
(Continued)

(58) Field of Classification Search
CPC .......... C08L 33/26; C08L 63/00–63/10; C08L 3/00–3/20; C09D 133/26;
(Continued)

(56) References Cited

U.S. PATENT DOCUMENTS 3,380,851 A 4/1968 Lindemann et al.
5,646,207 A 7/1997 Schell
(Continued)

FOREIGN PATENT DOCUMENTS

CN 102653623 A 9/2012
CN 103068855 A 4/2013
(Continued)

OTHER PUBLICATIONS

Young, Modifying Latex Emulsions With Epoxy Resin Dispersions, Adhesives Age, vol. 39, Issue 10; PPGS. 24-27, Sep. 1996.
(Continued)

*Primary Examiner* — Kregg T Brooks

(57) ABSTRACT

The present invention relates to an aqueous polymer dispersion composition comprising
a stable aqueous dispersion of single-phase thermoplastic polymer particles imbibed with a thermosettable compound having at least two oxirane groups. The thermoplastic polymer particles have a sufficient concentration of anti-agglomerating functional groups to stabilize the latex against agglomeration, and the thermoplastic polymer particles being a copolymerization product of a monomer mixture comprising, based on the total dry weight of the monomer mixture (a) 35 wt. % to 71 wt. % of ethyl acrylate, (b) 30 wt. % to 60 wt. % of methyl methacrylate, and (c) 5 wt. % to 10 wt. % methylol acrylamide.

6 Claims, 1 Drawing Sheet

(51) Int. Cl.
*D06N 3/04* (2006.01)
*D06N 3/12* (2006.01)
*C08L 63/00* (2006.01)
*C08L 33/26* (2006.01)
*D04H 1/64* (2012.01)
*D04H 1/587* (2012.01)

(52) U.S. Cl.
CPC ............ *D04H 1/64* (2013.01); *D04H 1/641* (2013.01); *D06N 3/0011* (2013.01); *D06N 3/042* (2013.01); *D06N 3/12* (2013.01); *C08L 2201/50* (2013.01); *C08L 2205/03* (2013.01); *D06N 2203/028* (2013.01)

(58) Field of Classification Search
CPC ...................... C09D 163/00–163/10; C09D 133/00–133/20; C09J 133/26; C09J 163/00–163/10; C09J 133/00–133/20; C08J 2333/26; C08J 2433/26; C08J 2363/00–2363/10; C08J 2463/00–2463/10; C08J 2333/00–2333/20; C08J 2433/00–2433/20; D06N 3/042; D06N 2203/028; D04H 1/587; D04H 1/64; D04H 1/641

See application file for complete search history.

(56) References Cited

U.S. PATENT DOCUMENTS

| | | | |
|---|---|---|---|
| 5,895,804 A | 4/1999 | Lee et al. | |
| 7,585,915 B2 | 9/2009 | Jakob et al. | |
| 8,178,600 B2 | 5/2012 | Kelly | |
| 2003/0149169 A1* | 8/2003 | Bammel | C08J 3/07 524/611 |
| 2005/0032970 A1 | 2/2005 | Jakob et al. | |
| 2005/0084675 A1 | 4/2005 | Wang | |
| 2006/0269679 A1 | 11/2006 | Patil | |
| 2007/0036899 A1 | 2/2007 | Patil et al. | |
| 2010/0233459 A1 | 9/2010 | Sigmund et al. | |
| 2010/0298483 A1 | 11/2010 | Allen et al. | |
| 2012/0058698 A1 | 3/2012 | Lin et al. | |
| 2012/0225978 A1 | 9/2012 | Kruger et al. | |
| 2012/0301621 A1 | 11/2012 | Dombrowski et al. | |

FOREIGN PATENT DOCUMENTS

| | | |
|---|---|---|
| CN | 103429653 A | 12/2013 |
| CN | 103582667 A | 2/2014 |
| EP | 354023 | 2/1990 |
| WO | 2007112503 A1 | 10/2007 |

OTHER PUBLICATIONS

Duda, et al.; Modeling of Composite Latex Particle Morphology by Off-Lattice Monte Carlo Simulation, Langmuir, vol. 21, PPGS. 1096-1102, 2005.

Search report from corresponding European 14896888.6 application, dated Jan. 29, 2018.

* cited by examiner

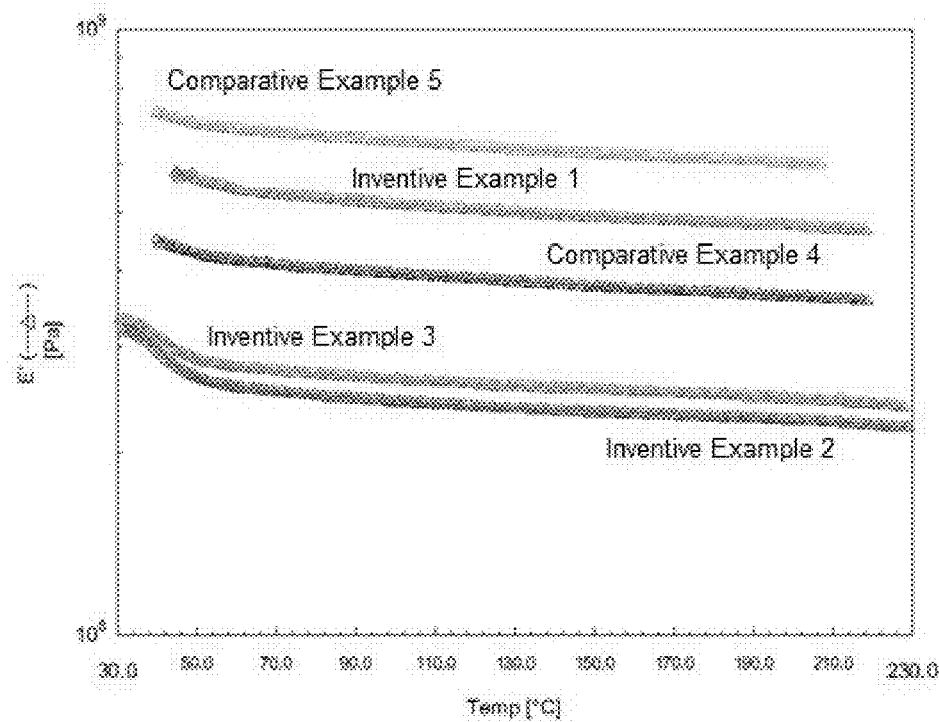

EPOXY RESIN IMBIBED POLYMER PARTICLES

INTRODUCTION

This invention relates to an aqueous polymer dispersion composition that can be used as part of a binder composition system for making spun-bond nonwoven products, such as nonwoven mats. In particular, the aqueous polymer dispersion compositions of the present invention, when applied to nonwoven fabrics, are capable of achieving an improved balance of tensile strength, percent elongation, and enhanced epoxy resin absorbability.

Nonwoven fabrics cover a wide array of products including consumer goods like mattress dust shields, disposable diaper cover fabrics, cleaning towels, carpets, draperies and industrial and commercial goods like wipe cloths, tire cords, conveyor belts, hospital fabrics, etc. The technology for nonwoven fabric production includes filament or staple filters processed through a dry or wet-lay sheet formation step and bonded by thermal, mechanical or chemical means.

Nonwoven fabrics consist of multiple layers of fibers that are inter-connected with each other. Therefore, it is necessary to apply a binding agent to firmly "glue" the web of fabric layers to provide durability and maintain physical integrity. These binding agents largely determine the wear properties of the nonwoven fabrics.

Aqueous dispersions of thermoplastic polymer particles, such as acrylic-based latexes, are the most widely used binding agents ("binders") for nonwoven fabrics. These thermoplastic polymer particles offer the greatest durability, color stability, and dry/wet performance. Acrylic-based latexes have the widest range of fabric hand properties. They can be formulated to vary from very soft to extremely hard. These latexes can be used in virtually all nonwovens applications.

In addition, various chemicals have been suggested to add to the acrylic-based latexes to enhance its stability thereby improving handling performance. For instance, acrylic-based latexes have known to be stabilized by surfactants, typically external anionic surfactants; however, stability is often enhanced by the inclusion of structural units in the polymer of carboxylic acid or alkali metal acetate groups arising from the polymerization of monomers such as acrylic acid, methacrylic acid, and itaconic acid and salts thereof.

Moreover, it has been reported that incorporating thermosettable compounds, such as epoxy resins, into acrylic-based latex particles improves "handling performance and wet and chemical strength advantages over unmodified latex formulations" while reducing or even eliminating the need for volatile organic compounds (VOCs). (Young, G. C., "Modifying Latex Emulsions with Epoxy Resin Dispersions", *Adhesives Age*, pp. 24-27, (1996)). Young suggests that reactivity can be suppressed by lowering the pH of the polymer prior introduction of the epoxy resin; however, a skilled artisan would recognize that colloidal stability of the latex would be compromised at low pH. Significantly, Young only teaches that up to 20% of the epoxy resin can be incorporated into the latex particle (with examples only up to 10% incorporation) and makes no mention of the percent solids of the latex with incorporated epoxy resin.

Consequently, it remains a challenge to imbibe more than 10% of a thermosettable compound into a high solids content polymer particle dispersion and maintain particle stability under standard industry protocols, namely heat age stability testing. It would therefore be an advance in the art to discover a heat-age stable curable latex 2-pack system that allows for the incorporation of relatively high amounts of a thermosettable compound.

Accordingly, the present provides an aqueous dispersion of thermoplastic polymer and a binder system with a further balanced improvement in tensile strength, elongation percentage, and viscoelasticity suitable to be used as binder for nonwoven fabrics.

SUMMARY OF INVENTION

The present invention relates an aqueous polymer dispersion composition comprising a stable aqueous dispersion of single-phase thermoplastic polymer particles imbibed with a thermosettable compound having at least two oxirane groups, which the thermoplastic polymer particles are characterized by having a sufficient concentration of anti-agglomerating functional groups to stabilize the latex against agglomeration, wherein the thermoplastic polymer particles being a copolymerization product of a monomer mixture comprising, based on the total dry weight of the monomer mixture (a) 35 wt. % to 71 wt. % of ethyl acrylate, (b) 30 wt. % to 60 wt. % of methyl methacrylate, and (c) 5 wt. % to 10 wt. % methylol acrylamide.

Preferably, the aqueous polymer dispersion composition as described above, wherein the thermosettable compound is liquid epoxy resin.

Preferably, the aqueous polymer dispersion composition as described above, wherein the concentration of anti-agglomerating functional groups is from 0.5 to 10 wt. %, based on the weight of the thermoplastic polymer particles.

Preferably, the aqueous polymer dispersion composition as described above, wherein the weight average particle size of the thermoplastic polymer particles is in the range of 150 nm to 450 nm.

This invention further relates to a binder system composition comprising: (a) an aqueous polymer dispersion composition comprising a stable aqueous dispersion of single-phase thermoplastic polymer particles imbibed with a thermosettable compound having at least two oxirane groups, which polymer particles are characterized by having a sufficient concentration of anti-agglomerating functional groups to stabilize the latex against agglomeration, wherein one of the functional groups is methylol acrylamide, and (b) cooked starch.

Preferably, the binder system composition as described above, wherein the concentration of the aqueous polymer dispersion composition comprising a stable aqueous dispersion of single-phase thermoplastic polymer particles imbibed with a thermosettable compound having at least two oxirane groups is from 40 to 50 wt. %, based on the total dry weight of the binder system.

Preferably, the binder system composition as described above, wherein the concentration of the cooked starch is from 50 to 60 wt. %, based on the total dry weight of the binder system composition.

This invention also relates to a method for forming a nonwoven fabric composite comprising the steps of (a) forming an aqueous polymer dispersion composition by imbibing a stable aqueous dispersion of single-phase thermoplastic polymer particles with a thermosettable compound having at least two oxirane groups, which polymer particles are characterized by having a sufficient concentration of anti-agglomerating functional groups to stabilize the latex against agglomeration, wherein one of the functional groups is methylol acrylamide; (b) mixing the aqueous polymer dispersion composition with a cooked starch to form a binder system composition; and (c) applying the binder system composition to a nonwoven fabric.

Preferably, the method as described above, wherein nonionic surfactants when the thermosettable compound having at least two oxirane groups is being imbibed with a stable aqueous dispersion of single-phase thermoplastic polymer particles.

Preferably, the method as described above, wherein the thermosettable compound is mixed as an micronized aqueous dispersion.

DESCRIPTION OF THE FIGURES

FIG. 1 shows the storage modulus values of Comparative Example 4 and Inventive Examples 1-3.

DETAILED DESCRIPTION OF THE INVENTION

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term "(meth)acrylate" means acrylate, methacrylate, and mixtures thereof and the term "(meth)acrylic" used herein means acrylic, methacrylic, and mixtures thereof.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, unless otherwise indicated, the term "average particle size" means a weight average particle size as determined by light scattering (LS) using a BI-90 particle size analyzer (Brookhaven Instruments Corp. Holtsville, N.Y.).

As used herein, the phrase "wt. %" stands for weight percent.

The binder system composition that is suitable for applications on nonwoven fabrics in accordance to the present invention comprises an aqueous polymer dispersion composition and a starch composition.

Aqueous Polymer Dispersion Composition

In a first aspect, the present invention comprises an aqueous polymer dispersion composition comprising a stable aqueous dispersion of single-phase thermoplastic polymer particles imbibed with a thermosettable compound having at least two oxirane groups. The thermosettable compound contains a sufficient concentration of anti-agglomerating functional groups to stabilize the single-phase thermoplastic polymer particles (also commonly referred to as "latex") against agglomeration.

The imbibed thermosettable compound preferably has a multiplicity of oxirane groups; more preferably, the thermosettable compound is a novolac resin, a di-, tri- or tetraglycidyl ether or a di-, or tri- or tetraglycidyl ester.

Examples of suitable thermosettable compounds include the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, and novolac resins, and combinations thereof. A commercially available thermosettable compound is D.E.R.™ 331 Liquid Epoxy Resin (a Trademark of The Dow Chemical Company and its affiliates).

On the other hand, the aqueous dispersions of the thermoplastic polymer particles can be achieved through free radical emulsion or suspension addition polymerization or by dispersion of a pre-formed polymer, under shear, into an aqueous medium. Examples of suitable latexes include acrylic, styrene-butadiene, urethane, ester, olefin, vinyl chloride, ethylene vinyl acetate, and polyvinyl acetate based latexes, with acrylic and styrene-acrylic latexes being preferred.

The thermoplastic polymer particles are further characterized by containing anti-agglomerating functional groups, which refer to hydrophilic groups that are sufficiently unreactive with the oxirane groups (and ester groups, if present) such that the latex particles are heat-age stable at 60° C. for 10 days. The term "heat-age stable at 60° C. for 10 days" is used herein to mean that the particle size of a latex subjected to heat-aging at 60° C. for 10 days does not increase by more than 30% beyond the particle size before such heat-age studies.

Anti-agglomerating functional groups can be incorporated into the polymer particles using monomers containing anti-agglomerating functional groups (anti-agglomerating monomers), although it would also be possible to incorporate such groups by grafting. The anti-agglomerating groups are believed to be effective because they are hydrophilic as well as non-reactive with oxirane groups under heat age conditions. The general class of such groups includes amide groups, acetoacetoxy groups, and strong protic acids, which are pH adjusted to form their conjugate bases.

Specific examples of anti-agglomerating monomers include acrylamide, methylol acrylamide, sodium styrene sulfonate, acetoacetoxyethyl methacrylate, and acrylamidomethyl-propane sulfonate. The corresponding anti-agglomerating functional groups of these monomers are illustrated below:

| Anti-agglomerating monomer | Anti-agglomerating functional group |
|---|---|
| Acrylamide | |
| Methylol Acrylamide | |

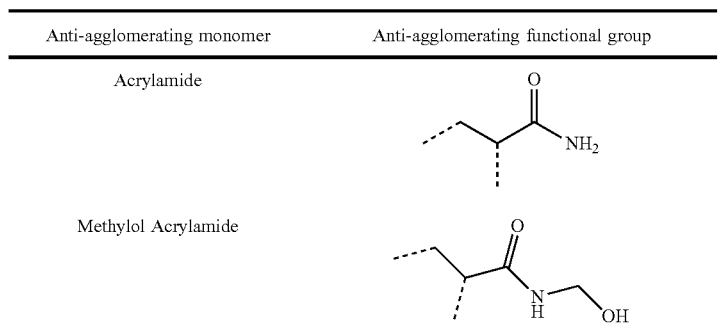

| Anti-agglomerating monomer | Anti-agglomerating functional group |
|---|---|
| Sodium p-styrene sulfonate | |
| Acetoacetoxyethyl methacrylate | |
| Acrylamido-methyl-propane sulfonate | |

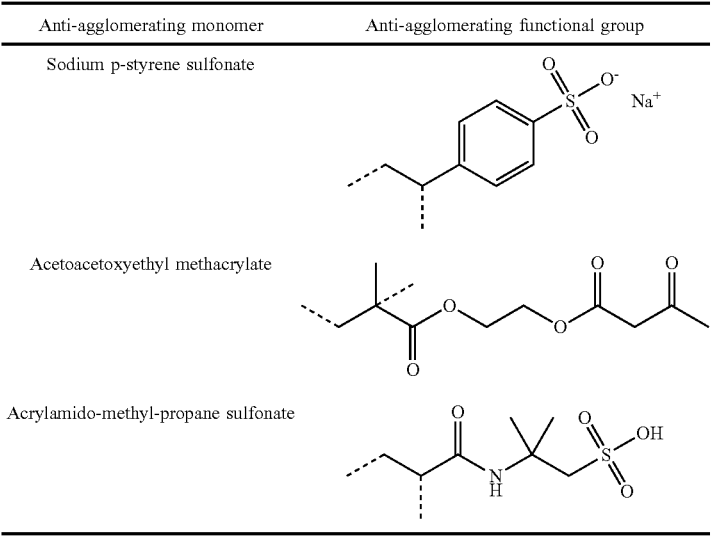

The dotted lines refer to the points of attachment of the anti-agglomerating functional monomer to the polymer. It should be noted that the phosphoethylmethacrylate and acrylamido-methyl-propane sulfonate groups are preferably predominantly present in their conjugate base form (i.e., salt form). AAEM is more stable as its enamine, which can be prepared post-polymerization by reacting the polymer with preferably a stoichiometric amount of a primary amine (R—NH2) or ammonia, where R is H or an alkyl group:

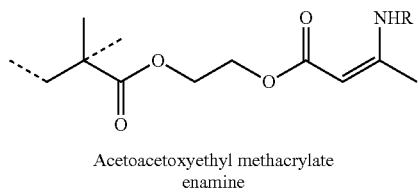

Acetoacetoxyethyl methacrylate enamine

Although carboxylic acid containing monomers are not anti-agglomerating, it has surprisingly been discovered that carboxylic acid groups can be incorporated into the polymer particles provided the polymer contains sufficient levels of anti-agglomerating groups and the pH is sufficiently high to maintain latex stability under heat age conditions.

Although not bound by theory, it is believed that anti-agglomerating groups are effective in stabilizing the polymer because the groups are both hydrophilic and non-reactive toward epoxy groups under heat age conditions. Where the anti-agglomerating groups arise from monomers containing strong acid functionality phosphoethyl methacrylate, methylol acrylamide, sodium styrene sulfonate, and acrylamido-methyl-propane sulfonate), it has been discovered that colloidal stability and anti-agglomeration is achieved by adjusting the pH of the latex to a level above the first $pK_a$ of a polyprotic acid (such as phosphoethyl methacrylate) or above the $pK_a$ of a monoprotic acid (such as sodium styrene sulfonate, and acrylamido-methyl-propane sulfonate). If the pH is too low, acid catalyzed oxirane ring opening can occur—at higher pH, such a mechanism is not available and the conjugate base is non-nucleophilic under heat age conditions.

The concentration of anti-agglomerating functional groups in the polymer is sufficient to stabilize the thermoplastic polymer under heat age conditions, preferably from 0.5, more preferably from 1, to preferably 10 and more preferably to 5 weight percent, based on the weight of the polymer. Preferably, the concentration of carboxylic acid groups can be up to 20 weight percent based on the weight of the polymer, more preferably from 0.1 to 5 weight percent.

In another aspect of the present invention, the aqueous dispersions of the thermoplastic polymer particles is an acrylic-latex containing structural units of anti-agglomerating functional groups. Monomers suitable for the preparation of such acrylic-latexes include acrylates and methacrylates such as methylol acrylamide, methyl acrylate, ethyl acrylate, butyl acrylate, 2-ethylhexyl acrylate, methyl methacrylate, ethyl methacrylate, butyl methacrylate, and 2-ethylhexyl methacrylate, and combinations thereof. It may be advantageous to include chain transfer agents in the latex preparation. Examples of chain transfer agents include, but are not limited to, dodecylmercaptan, butylmercaptopropionate, methylmercaptopropionate, mercaptopropionic acid, etc.

In one embodiment in accordance to the present invention, the monomers for the acrylic-latex comprises, based on the total dry weight of monomer mixture, 35 to 70%, or preferably, 45 to 55% of ethyl acrylate; 30 to 60%, or preferably, 40 to 50% of methyl methacrylate; and 5 to 10%, or preferably, 3 to 6% of methylol acrylamide.

As mentioned previously, structural units of one or more acid monomers may also be included, most notably acrylic acid, methacrylic acid, and itaconic acid. Furthermore, the acrylic latexes may also include structural units of other monomers such as styrene and acrylonitrile, as well as monomers of imparting co-curable functionality such as glycidyl acrylates and methacrylates.

In certain embodiments, it may be advantageous to incorporate into the polymer copolymerized multi-ethylenically unsaturated monomer groups. Multi-ehtylenically unsaturated monomers include, for example, allyl (meth) acrylate, diallyl phthalate, 1,4-butylene glycol di(meth)acrylate, 1,2-ethylene glycol di(meth)acrylate, 1,6-hexanediol di(meth) acrylate, and divinyl benzene. It may be especially advantageous to incorporate such monomer groups non-uniformly into the polymer to form multiphase polymer particles to create a core-shell, hemispherical, or occluded morphology.

In certain embodiments, it may be beneficial to use multiphase polymer particles such as those disclosed by Duda et al. in Langmuir 2005, 21, 1096-1102. The preparation of these morphologies is well known in the art. A multi-stage emulsion polymerization process usually results in the formation of at least two mutually incompatible polymer compositions, thereby resulting in the formation of at least two phases. The mutual incompatibility of two or more polymer compositions and the resultant multiphase structure of the polymer particles may be determined in a variety of ways including scanning electron microscopy using staining techniques to emphasize the difference between the phases.

Multiphase polymer particles may be of various geometries including core/shell or core/sheath particles, core/shell particles with shell phases partially encapsulating the core, and core/shell particles with a multiplicity of cores. The final properties of these latexes are often achieved by balancing the monomer compositions of the individual phases and their relative proportions. For the present invention, it may be advantageous to use disparate or similar Tgs, and similar or disparate hydrophobicities. The end use application of the latex usually dictates the properties of each polymer phase.

The morphology of the acrylic-latexes is not limited to strictly organic materials. It may be advantageous to make use of polymers that have embedded or adsorbed inorganic phase or domain; for example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483A1. In another example, the coating composition may include polymer-encapsulated opacifying pigment particles as described in WO 2007/112503A1.

The imbibed acrylic thermoplastic polymer particles are advantageously prepared separately from the thermosettable compound using conventional emulsion polymerization techniques, then combined with the thermosettable compound, which can be neat or in the form of an aqueous dispersion, preferably as an aqueous dispersion, more preferably as a micronized aqueous dispersion. When the thermosettable compound is added as an aqueous dispersion, the emulsion is stabilized with a stabilizing amount of a surfactant, preferably at a concentration in the range of about 0.5 to about 5% by weight. Non-ionic surfactants are preferred, including APEO free, non-inionic wetting agents such as polyalkylene oxdie block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as Triton X-405 Octylphenol Ethoxylate (a trademark of The Dow Chemical Company or its affiliates). When the thermosettable compound is combined with the latex as a neat compound, imbibing is facilitated by agitation at or above room temperature.

High solids content imbibed acrylic-latexes, that is, acrylic-latexes with solids content of at least 40 weight percent and particularly in the range of 45-60 weight percent, based on the total weight of the latex, are achievable with the composition of the present invention. Moreover, these imbibed latexes, as distinct from those of the prior art, can be modified to include surprisingly high levels of the thermosettable compound, typically in the range of 25-60 weight percent or 30-50 weigh percent, based on the weight of the thermoplastic particles and the thermosettable compound. These imbibed latexes can be prepared without solvents and therefore are capable of achieving a virtual absence of VOCs.

The imbibed aqueous polymer dispersion composition is useful as one part of a two-pack formulation, the second part being a hardener (i.e., curing agent) that is added prior to use that causes the thermosettable compound to set. Accordingly, the imbibed aqueous polymer dispersion composition of the present invention is substantially free of a hardener; that is, there is insufficient concentration of a compound that promotes oxirane ring opening to destabilize the thermosettable compound. Preferably, the imbibed aqueous polymer dispersion composition contains not more than 0.05%, more preferably not more than 0.005%, and most preferably 0% of a hardener.

The imbibed aqueous polymer dispersion compositions can be cured with a water compatible external hardener. Examples of hardeners excluded from the composition include amines, amidoamines, hydrazine, anhydrides, isocyanates, phenolic resins, polyamides, and polymercaptans. The amount of hardener used generally varies from about 1:0.75 to 1:1.5 nucleophile equivalent (e.g., amine equivalent) to oxirane equivalent.

Examples of suitable hardeners include diethylenetriamine, triethyleneteramine, tetraethylene-pentamine, 2,2,4-trimethylhexamethylenediamine, 2,4,4-trimethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexaine, 1,4-diamino-3,6-diethylcyclohexane, 1,2-diamino-4-ethylcyclohexane, 1,4-diamino-3,6-diethylcyclohexane, 1-cyclohexyl1-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl)propane, 3,3'-dimethyl-4,4'-diaminodicyclohexylmethane, 3-amino-1-cyclohexane-amino-propane, 1,3-and 1,4-bis(aminomethyl)cyclohexane, m-xylylenediamine, p-xylylenediamine, polyoxypropylenediamines, polyamidoamines, and aminoplast resins formed by the reaction of ureas and melamines with aldehydes.

Commercial examples of water-compatible hardeners include Epi-cure 8535, 8536, 8537, 8290 and 8292 curing agents; Anquamine 401 curing agent; Casamid 360 and 362 curing agents; Epilink 381 curing agent, DP660 curing agent, Hardener HZ350, 92-113, and 92-116; Beckopox EH659W, EH623W, VEH2133W curing agents; and Epotuf 37-680 and 27-681 curing agents.

The imbibed aqueous polymer dispersion composition can be cured over a wide temperature range for a time effective to cure the thermosettable resin. In another aspect the present invention is a method for forming a cured composite comprising the steps of a) contacting a composition containing the imbibed latex, such as a paint, with a hardener to form a curable composition, b) applying the curable composition to a substrate, and c) curing the applied composition, wherein the steps a) and b) are sequential or concomitant. Concomitant addition can be conveniently carried out using dual nozzle spraying. Examples of substrates include metal, plastic, concrete, wood, asphalt, hair, paper, leather, rubber, foam, or textiles.

Particle size is in a range that provides stable imbibed aqueous polymer dispersion composition without problems associated with sedimentation. The weight average particle size (as determined by capillary hydrodynamic fractionation) of the imbibed latex is typically in the range of from 150 nm to 450 nm.

The coating composition according to the present invention may further include one or more of the following additives: solvents, fillers, pigments (such as titanium dioxide, mica, calcium carbonate, silica, zinc oxide, milled glass, aluminum trihydrate, talc, antimony trioxide, fly ash, and clay), polymer encapsulated pigments (such as polymer-encapsulated or partially encapsulated titanium dioxide, zinc oxide, or lithopone), polymers or polymer emulsions adsorbing or bonding to the surface of pigments such as titanium dioxide, hollow pigments, including pigments having one or more voids, dispersants (such as aminoalcohols and polycarboxylates), surfactants, defoamers, preservatives, such as biocides, mildewcides, fungicides, algaecides, and combinations thereof, flow agents, leveling agents, and additional neutralizing agents (such as hydroxides, amines, ammonia, and carbonates).

Starch Composition

The binder system composition disclosed in accordance to the present invention comprises a starch. In some embodiments, a cooked starch comprising fluid-swollen particles is provided. For example, a starch can be mixed with water and the mixture cooked at a certain temperature range (e.g., 130 F-250 F) until fluid-swollen particles are formed. Cooking times and temperature for forming the fluide-swollen particles can vary. The starch forms fluid-swollen particles that swell, but do not burst or dissolve. For example, in some embodiments, the cooked starch has a granular swelling power (GSP) from about 1 to about 20, preferably, the cooked starch has a GSP from about 9 to about 17, and more preferably, the cooked starch has a GSP from about 9 to 13. In accordance to one embodiment of the present invention, the amount of starch composition in the binder system composition is typically 50 to 60 wt. %, based on the total dry weight of the binder system composition.

In some embodiments, the starch used in the sizing composition is not easily water soluble. In some embodiments, the starch used in the sizing composition may be a particular starch that retains some granular structure such that there remain discrete particles after hydration. Particulate starches can be prepared by a number of techniques such as chemical crosslinking, physical modification, physical association, and/or hydration under controlled conditions.

Suitable starches for the instant binding composition include any modified or unmodified starch derived from starch sources such as corn, wheat, potato, tapioca, cassava, waxy maize, sago, rice, hybrid starches, genetically modified starches, and combinations thereof. Examples of starches that may be used in the sizing composition include: oxidized starches, cationic starches such as amine modified starches, ester or ether modified starches such as acetate starch, starch phosphates, succinylate starch, hydroxyalkyl starch ethers, propylene oxide modified starch, and carboxymethyl startch, starch graft copolymers such as starch-graft-polyacrylamide and startch-graft-acrylonitrile, cross-linked starches such as CARGILL C-FILM™ commercially available from Cargill, Ltd., and NATIONAL™ 1554 commercially available from Celanese, Ltd., di-starch phosphate, di-starch adipate, acetylated di-starch adipate, hydroxypropyl di-starch phosphate, and acetylated di-starch phosphate, unmodified high amylase corn starch (HYLON®V, HYLON®VII commercially available from Celanese, Ltd., Dallas, Tex.), and combinations thereof. Crosslinked starches may be formed by treatment of a starch wth any number of crosslinking agents such as bifunctional etherifying and/or esterifying agents such as epichlorohydrin, bis-β-chloroethyl ether, dibasic organic acids, phosphates, phosphorus oxychloride, trimetaphosphate, and linear mixed anhydrides or acetic and di- or tribasic carboxylic acids.

EXAMPLES

The following examples are for illustrative purposes only and are not intended to limit the scope of the invention. Table 1 below lists the raw materials used for preparation of Examples in accordance with one embodiment of the present invention. Table 2 below also includes the chemicals used to prepare the binder systems that are being illustrated herein as Examples 1-3 and Comparative Examples 4 and 5.

TABLE 1

| Raw material | Function | Supplier |
| --- | --- | --- |
| PRIMAL ™ TR407 | Thermoplastic polymer (latex) containing methylol acrylamide (MOA) functional monomer | Dow Chemical |
| EXP ™ 4674 | Thermoplastic polymer (latex) containing phosphoethylmethacrylate (PEM) functional monomer | Dow Chemical |
| D.E.R. ™ 331 | Liquid epoxy resin | Dow Chemical |
| TRITON ™ X-405 | Surfactant | Dow Chemical |
| Cargill C-Film 07312 | Starch | Cargill |

Inventive Example 1

Preparation of a Polymer Binder System with MOA Monomer Latex Imbibed with Epoxy Resin and Starch DER-331 Liquid Epoxy Resin, deionized water, and TRITON™ X-405 surfactant were mixed in a glass jar in amounts shown in Table 2 below. The pH of each latex sample was adjusted, in accordance to Table 2, by the addition of ammonia solution prior to the addition of the epoxy resin. The mixtures were agitated for~15 min with a magnetic stirrer, and then homogenized for ~10 seconds using a Pro 250 handheld homogenizer (Pro Scientific, Inc.). A MOA monomer latex (e.g., the commercially available PRIMAL™ TR407) was then added over 2 minutes to the epoxy emulsions with stirring. The blends were agitated for 30 minutes, at which time more de-ionized water was added (110 grams). Stirring was continued for 30 minutes and the aqueous polymer dispersion compositions were allowed to stand overnight.

Thereafter, 1055.3 grams of the commercially available starch power, in this case Cargill C-Film 07312, was mixed with water then heated at 80° C. for 30 minutes. The starch mixture was then cooled to ambient temperature.

Finally, the cooled starch was mixed the aqueous polymer dispersion composition for 30 minutes. Therefore, the binder system composition in accordance to one embodiment of the present invention is formed.

Comparative Example 2

Preparation of A Polymer Binder System with PEM Monomer Latex Imbibed with Epoxy Resin and Starch A binder system was prepared as described in Example 1 above, except that instead of using PRIMAL TR407, 1000 grams of PEM monomer latex (commercially available as EXP™ 4674) was added to the epoxy emulsions with stirring.

Comparative Example 3

Preparation of A Binder System with PEM Monomer Latex Imbibed with Epoxy Resin and Starch A binder system was prepared as described in Example 1 above, except that, instead of using PRIMAL TR407, 1000 grams of PEM monomer latex (commercially available as EXP™ 4674) was added to the epoxy emulsions with stirring.

Comparative Example 4

Preparation of Binder Composition with MOA Monomer Latex, Starch, and No Epoxy Resin

TABLE 2

|  | Example 1 | Example 2 | Example 3 | Example 4 |
|---|---|---|---|---|
| DI Water (g) | 116.0 | 116.0 | 116.0 |  |
| TRITON X-405 (g) | 2.7 | 3.1 | 3.1 |  |
| Epoxy Resin (g) | 19.0 | 21.5 | 21.5 |  |
| Latex ID | Polymer A | Polymer B | Polymer B | polymer A |
| Latex Mass (g) | 1000.0 | 1000.0 | 1000.0 | 1000.0 |
| Starch, Cargil C film, by solid (g) | 703.5 | 797.3 | 510.0 | 675.0 |

Application of Polymer Binder System to Nonwoven Mats

After the all the binder system Examples 1-4 have been prepared, each binder system example was then mixed with water to a diluted solid content of 9%. Then, by using calender rolls, in an open environment and ambient temperature, each binder system Examples 1-4 spun-bond nonwoven mats were roll-coated with each binder system example above. The amount of binder system example to be added to each spun-bond nonwoven mat constitutes 20% of the spun-bond nonwoven mat's weigh. Finally, all of the spun-bond nonwoven mats dosed with binder system examples were cured for 3 minutes at 200° C. in a Mathis oven.

Evaluation of Spun-Bond Nonwoven Mats Dosed With Polymer Binder System Examples (Dosed Nonwoven Mats)

Test Methods: The following test methods are used in the analyses of the Dosed Nonwoven Mats.

(1) Mechanical Properties Evaluated:

Tensile Max (for maximum tensile stress) for each Dosed Nonwoven Mats was tested by using ISO 9073-3-1989 on Universal Testing Machine (Gotech AI7000M). Coating samples were cut into 35 cm×5 cm strips The Dosed Nonwoven Mats test strips were tested at a gauge length of 20 cm and a crosshead speed of 200 mm/min. The testing temperature is set at 23° C.

Elongation at Break (test for elongation) was tested by using ISO 9073-3-1989 on Universal Testing Machine (Gotech AI7000M). Coating samples were cut into 35 cm×5 cm strips. The testing temperature is set at 23° C. with a gauge length of 20 cm and crosshead speed of 200 mm/min.

Dynamic Mechanical Analysis(DMA): the viscoelastic properties were tested on the nonwoven samples by using TA Instruments Q800 DMA. The testing parameter was that the ramping temperature was set from room temperature to 200° C., at the rate of increase at 4° C. per minute.

Test Results

Table 3 below compares the evaluation results for the analyses that have been performed on Dosed Nonwoven Mat 1 (the nonwoven mat applied with Inventive Example 1), Dosed Nonwoven Mat 2 (the nonwoven mat applied with Comparative Example 2), Dosed Nonwoven Mat 3 (the nonwoven mat applied with Comparative Example 3), and Dosed Nonwoven Mat 4 (the nonwoven mat applied with Comparative Example 4),

TABLE 3

| Inventive Example | Tensile Strength (Newton) | Elongation/% |
|---|---|---|
| Dosed Nonwoven Mat 1 | 650 | 33 |
| Dosed Nonwoven Mat 2 | 507 | 32 |
| Dosed Nonwoven Mat 3 | 515 | 31 |
| Dosed Nonwoven Mat 4 | 559 | 30 |

As shown in Table 3 above, when comparing to Comparable Examples 2 and 3 (with contains imbibed aqueous polymer dispersion composition containing PEM functional monomer), Inventive Example 1, which contains imbibed aqueous polymer dispersion composition containing MOA functional monomer, shows overall superior physical properties. Specifically, comparing to Comparative Examples 2 and 3, Inventive Example 1 shows better tensile strength and elongation property. As comparing to Comparative Example 4, even though both Inventive Example 1 and Comparative Example 4 uses a binder system composition with MOA functional monomers, Inventive Example 1 shows better physical properties due to the use of aqueous epoxy resin as the thermosettable compound.

In addition, FIG. 1 below shows that Inventive Example 1 also demonstrates higher storage modulus values over the other Examples, which indicates that Inventive Example 1 exhibits superior viscoelastic properties.

We claim:

1. A binder system composition comprising: (a) an aqueous polymer dispersion composition comprising a stable aqueous dispersion of single-phase thermoplastic polymer particles imbibed with a thermosettable compound having at least two oxirane groups, which polymer particles are characterized by having a sufficient concentration of anti-agglomerating functional groups to stabilize the dispersion against agglomeration, wherein one of the functional groups is methylol acrylamide, wherein the aqueous polymer dispersion composition is prepared without non-water solvent, and (b) cooked starch.

2. The binder system composition as claimed in claim 1, wherein the concentration of the aqueous polymer dispersion composition comprising a stable aqueous dispersion of single-phase thermoplastic polymer particles imbibed with a thermosettable compound having at least two oxirane groups is from 40 to 50 wt. %, based on the total dry weight of the binder system.

3. The binder system composition as claimed in claim 1, wherein the concentration of the cooked starch is from 50 to 60 wt. %, based on the total dry weight of the binder system composition.

4. A method for forming a nonwoven fabric composite comprising the steps of a) forming an aqueous polymer dispersion composition by imbibing a stable aqueous dispersion of single-phase thermoplastic polymer particles with a thermosettable compound having at least two oxirane groups, which polymer particles are characterized by having a sufficient concentration of anti-agglomerating functional groups to stabilize the dispersion against agglomeration, wherein one of the functional groups is methylol acrylamide, wherein the aqueous polymer dispersion composition is prepared without non-water solvent;

b) mixing the aqueous polymer dispersion composition with a cooked starch to form a binder system composition; and c) applying the binder system composition to a nonwoven fabric.

5. The method of claim 4, wherein non-ionic surfactants when the thermosettable compound having at least two oxirane groups is being imbibed with a stable aqueous dispersion of single-phase thermoplastic polymer particles.

6. The method of claim 4, wherein the thermosettable compound is mixed as a micronized aqueous dispersion.

* * * * *